United States Patent
Ferderber

(10) Patent No.: US 6,955,519 B1
(45) Date of Patent: Oct. 18, 2005

(54) DAVIT SYSTEM FOR LIFTING BOATS, JET SKIS, MOTORCYCLES AND THE LIKE

(76) Inventor: Fred Ferderber, 370 Palmdale Dr., Oldsmar, FL (US) 34677

( * ) Notice: Subject to any disclaimer, the term of this patent is extended or adjusted under 35 U.S.C. 154(b) by 0 days.

(21) Appl. No.: 10/709,496

(22) Filed: May 10, 2004

(51) Int. Cl.[7] ............................................. B66C 23/00
(52) U.S. Cl. ...................... 414/680; 114/259; 296/26.1
(58) Field of Search ................. 414/680, 549, 414/462, 541, 522, 537, 480; 296/26.09, 296/26.1; 114/259, 258, 365, 368, 369, 370, 114/372, 373

(56) References Cited

U.S. PATENT DOCUMENTS 1,388,831 A * 8/1921 Broady .................... 114/372 X
2,527,060 A * 10/1950 Dohn ........................ 114/372
6,591,770 B1 * 7/2003 Blackmore .................. 114/48
6,698,994 B2 * 3/2004 Barrett ....................... 414/462

* cited by examiner

Primary Examiner—Donald W. Underwood
(74) Attorney, Agent, or Firm—Smith & Hopen, P.A.; Ronald E. Smith

(57) ABSTRACT

A davit system includes an elongate base having a straight part and a leading part that is angled downwardly relative to the straight part at a predetermined angle. An elongate boom arm is slideably disposed in a hollow interior of the elongate base. The boom arm is fully retracted within the hollow interior of the elongate base when an elongate screw is rotated in a first direction a predetermined number of times and the boom arm is fully extended from the hollow interior of the elongate base when the elongate screw is rotated in a second direction a predetermined number of times. The boom arm is downwardly angled at the predetermined angle when the boom arm is in its fully extended position. In a first embodiment, two elongate bases and boom arms are provided and each boom arm supports a cradle at its leading end for lifting a boat.

7 Claims, 8 Drawing Sheets

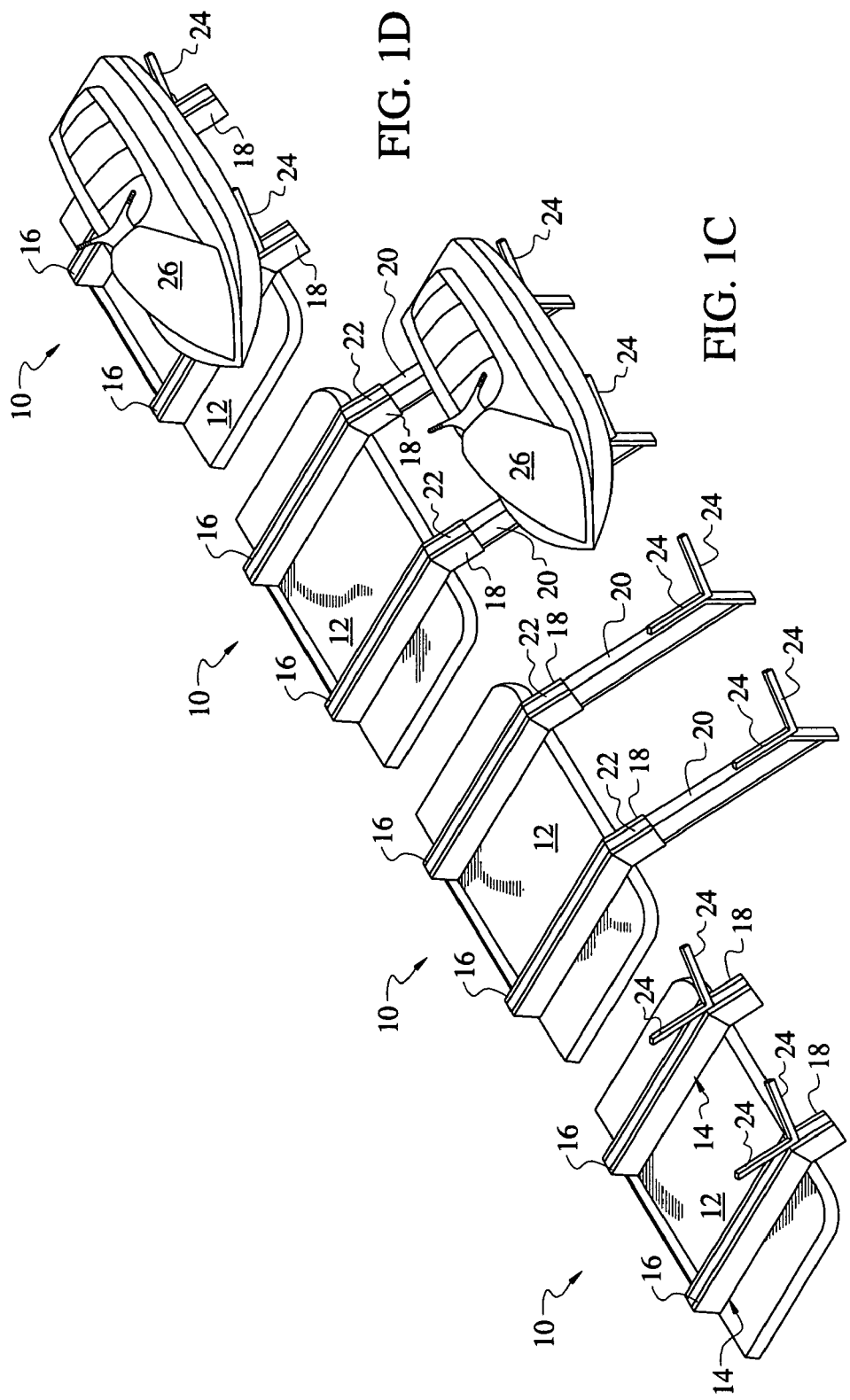

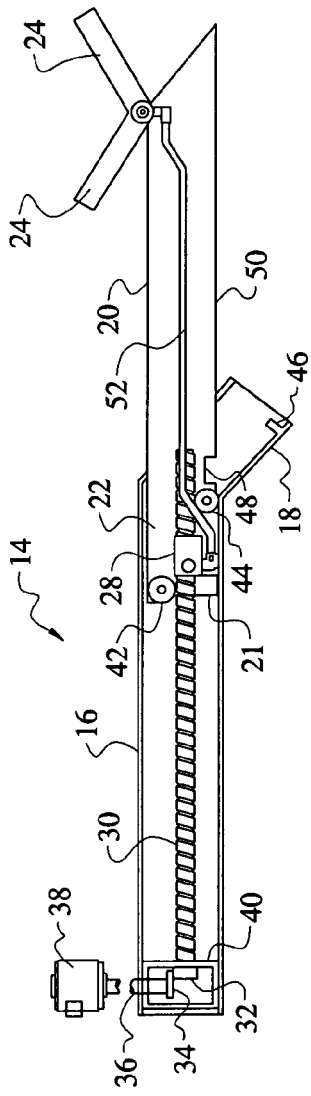
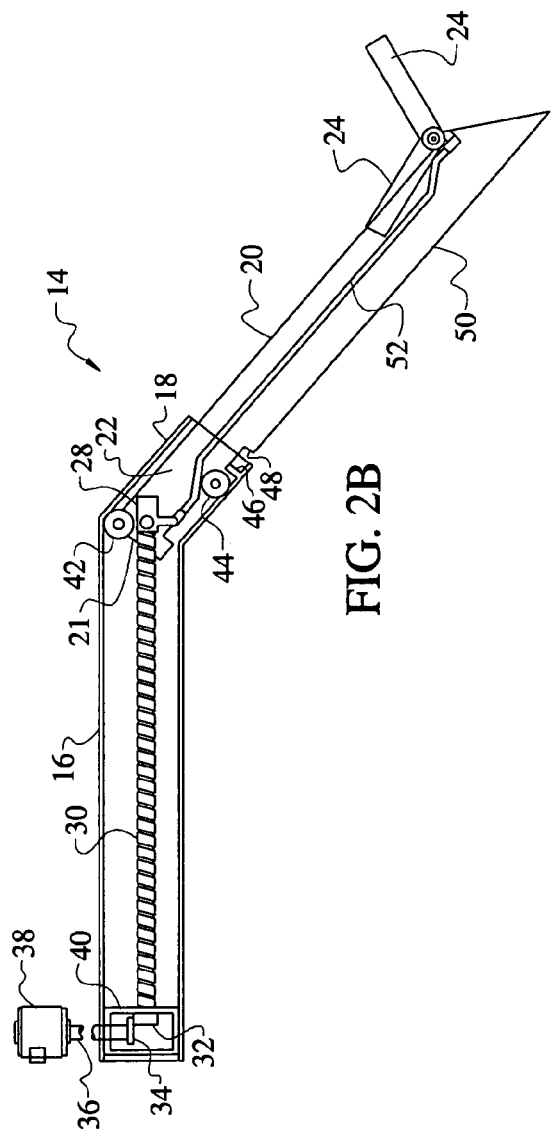
FIG. 2A
FIG. 2B

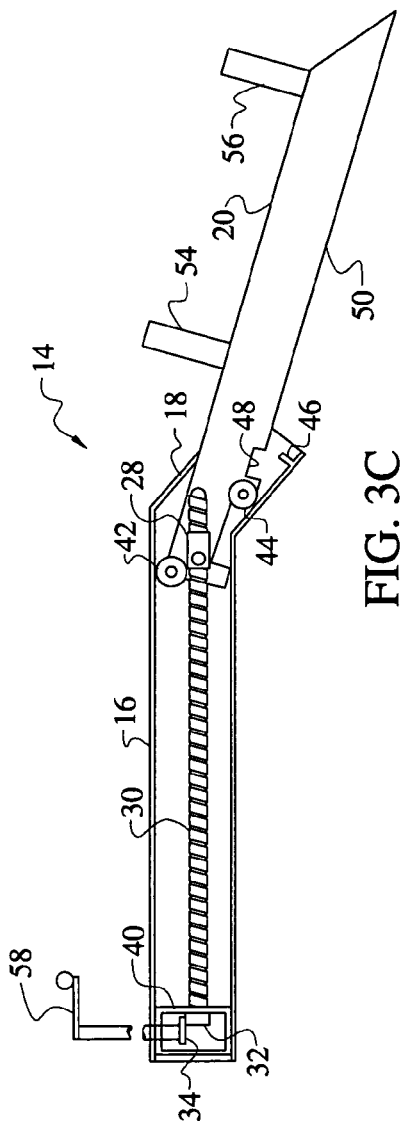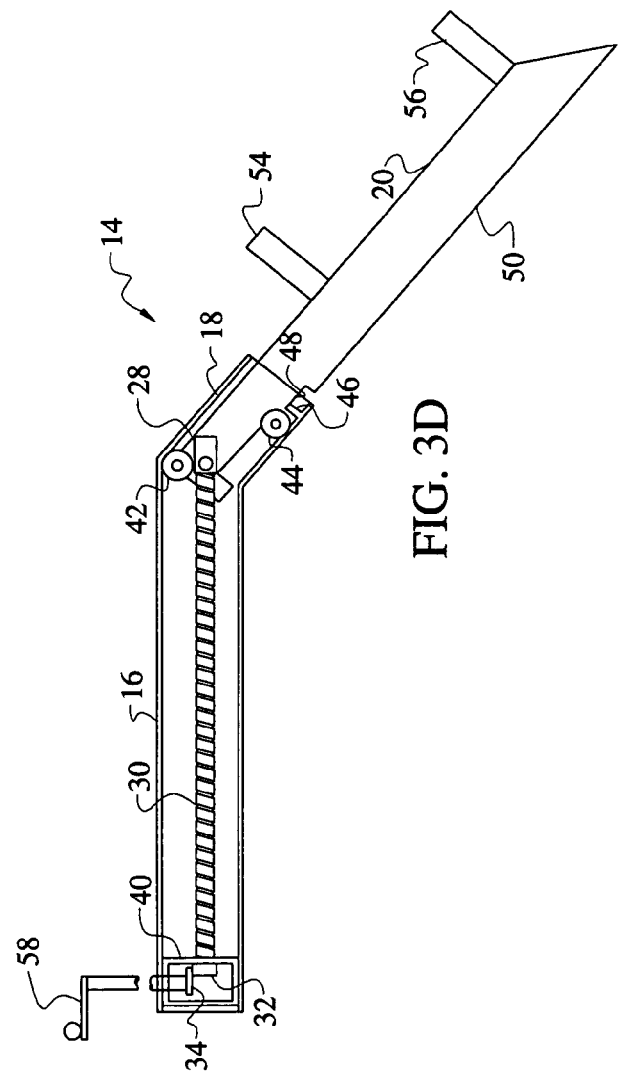

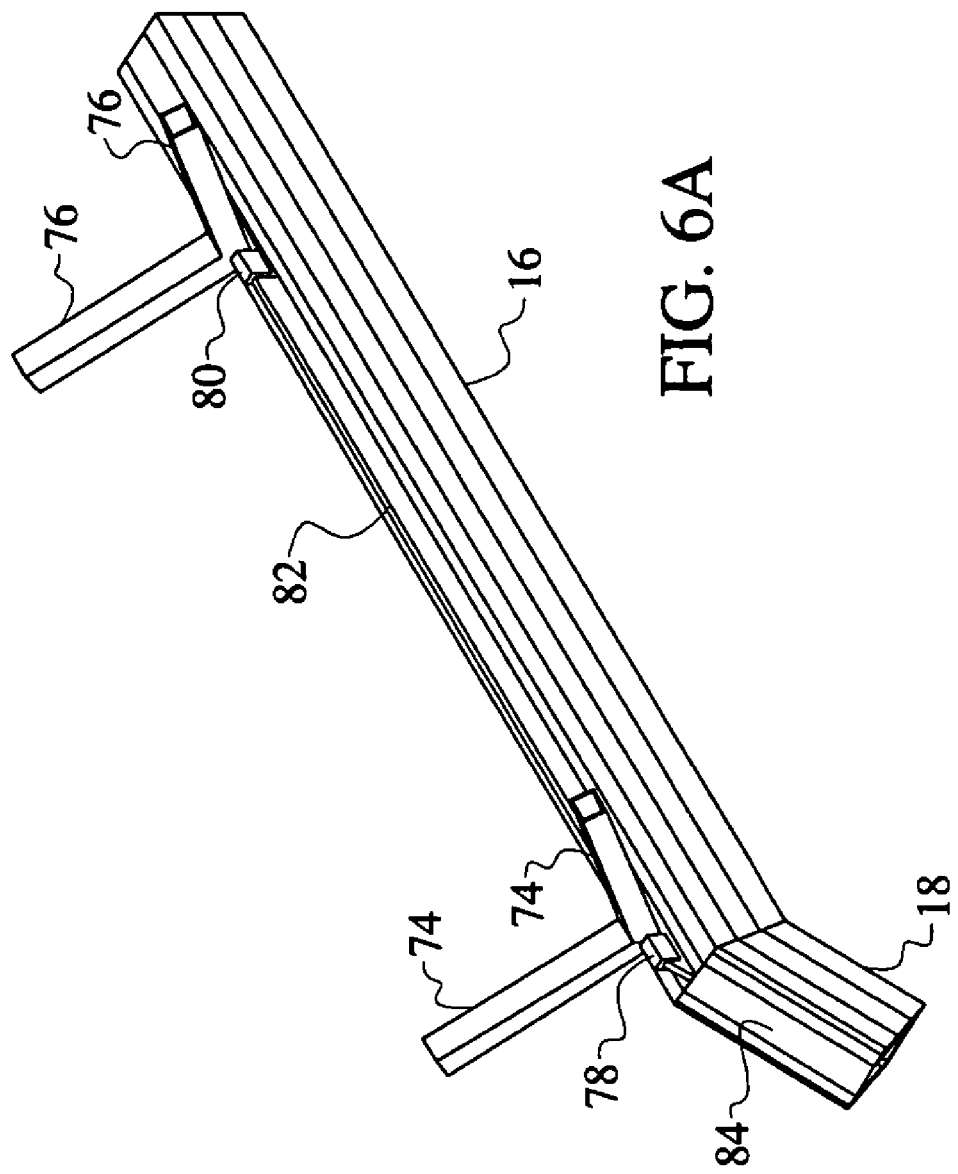

DAVIT SYSTEM FOR LIFTING BOATS, JET SKIS, MOTORCYCLES AND THE LIKE

TECHNICAL FIELD

This invention relates, generally, to davit systems. More particularly, it relates to a davit system having a low profile that supports and lifts various types of vehicles onto a dock, a swim platform, another vehicle, or other loading platforms.

BACKGROUND ART

The Merriam-Webster dictionary defines a davit as a crane that projects over the side of a ship or a hatchway and is used especially for boats, anchors, or cargo.

In most davit systems, a winch or similar device uncoils a plurality of cables that extend to a boat or other structure to be lifted. The free ends of the cables are secured to the structure to be lifted and then the winch is operated in an opposite direction to retract the cables and thus lift the structure. In most designs, a cantilever construction is employed so that the cables can reach out whatever distance is needed to reach a operative position over the structure to be lifted.

The stress that appears on a davit system is therefore quite high. The downwardly directed force appearing on the distal free ends of each cantilevered arm during a lifting operation is of course multiplied by the length of the arm. As a result, conventional davit systems are built for strength. This increases their weight and their manufacturing expense.

What is needed, then, is a davit system that is under less stress when operating than a typical, cantilevered davit system. Such a davit system could be manufactured at a lower cost than the high strength davit systems that are currently in widespread use.

However, in view of the prior art taken as a whole at the time the present invention was made, it was not obvious to those of ordinary skill how the identified need for an improved davit system could be fulfilled.

MODE FOR THE INVENTION

The long-standing but heretofore unfulfilled need for a means for a davit system that is not subject to the limitations of conventional davit systems is now met by a new, useful, and non-obvious invention.

The novel davit system includes an elongate base having a hollow interior and an open top. The elongate base includes a straight part and an angled part that is angled downwardly relative to the straight part at a predetermined angle. An elongate boom arm is slideably disposed in the hollow interior of the elongate base.

An elongate screw is rotatably mounted within the hollow interior of the elongate base and a screw follower is mounted to a trailing end of the elongate boom arm. The screw follower is in screw-threaded engagement with the elongate screw so that rotation of the elongate screw in a first direction effects travel of the screw follower and hence of the elongate boom arm in a first direction relative to the elongate base and so that rotation of the elongate screw in a second direction effects travel of the screw follower and hence of the elongate boom arm in a second direction relative to the elongate base;

The elongate boom arm is fully retracted within the hollow interior of the elongate base when the elongate screw has been rotated in said first direction a predetermined number of times. The elongate boom arm is fully extended from the hollow interior of the elongate base when the elongate screw has been rotated in the second direction a predetermined number of times.

The elongate boom arm is downwardly angled at the predetermined angle when the elongate boom arm is in the fully extended position.

A first gear is secured to a trailing end of the elongate screw for conjoint rotation therewith and a second gear is meshingly engaged to the first gear so that rotation of the second gear effects simultaneous rotation of the first gear. An output shaft to which the second gear is secured is rotated in a first direction to cause extension of the elongate boom arm from the hollow interior of the elongate base and is rotated in a second direction to cause retraction of the elongate boom arm into the elongate base.

The output shaft may be provided in the form of an output shaft of a reversible motor or in the form of the output shaft of a hand crank.

A first roller is rotatably mounted to an upper, trailing end of the elongate boom arm and a second roller is rotatably mounted to a lower, trailing end of the elongate boom arm in leading relation to the first roller. The first and second rollers are longitudinally spaced from one another by a predetermined distance. The first roller is disposed in engagement with the elongate base when the elongate boom arm is fully extended and the said second roller is disposed in engagement with the downwardly angled part of the elongate base when the elongate boom arm is fully extended.

A detent is formed in the downwardly angled part of the elongate base. A notch is formed in the elongate boom arm near the trailing end. The detent is disposed within the notch when the elongate boom arm is fully extended to prevent the elongate boom arm from sliding out of the elongate base.

A single elongate base and boom arm have utility in loading a motorcycle from a road surface to a trailer. The boom arm, when extended, provides a ramp that enables the motorcycle to be driven or pushed up to the level of the elongate base which is positioned in the bed of a trailer, pickup truck or the like.

In other embodiments, a pair of elongate bases and therefore a pair of boom arms are disposed in parallel, transversely spaced apart relation to one another. In an embodiment having utility for lifting a water craft from the water, a pair of cradle arms are pivotally mounted to the leading end of each elongate boom arm. Each pair of cradle arms collectively form a "V" shape for cradling a water craft. A tab is formed integrally with each pair of cradle arms where the cradle arms meet. The tab is pivotally mounted to a leading end of the elongate boom arm. An elongate, rigid link has a leading end pivotally secured to the tab and a trailing end pivotally secured to the screw follower. Accordingly, each pair of cradle arms is disposed in a first upright configuration when the elongate boom arms are fully retracted, when the elongate boom arms are fully extended, and when the elongate boom arms are in any position between the fully retracted and fully extended positions.

Where a pair of elongate bases and therefore a pair of boom arms are disposed in parallel, transversely spaced apart relation to one another, a flat, planar-in-configuration support surface may be positioned between the elongate bases and attached to the elongate boom arms so that the flat, planar surface provides a ramp when both elongate boom arms are fully extended.

A primary advantage of the invention is that it avoids the tall, cantilevered structure of a conventional davit and thus avoids the stresses that appear on such structures. As a result, the novel davit may be built of materials having less strength. Such materials are lighter-in-weight and less expensive.

Another advantage is that the novel structure has a low profile. Thus, it can be mounted on trailers, pickup trucks, and the like.

Still another advantage is that the novel structure can be used in the form of a single structure to provide a motorcycle ramp and in the form of a pair of parallel, transversely spaced apart structures to provide ramps for vehicles such as jet skis.

Another advantage in an embodiment used to lift boats from water is that the arms that cradle the boat may be maintained in a level plane at all times so that the boat is held level as the elongate boom arms are retracted.

These and other advantages will become apparent as this disclosure proceeds. The invention includes the features of construction, arrangement of parts, and combination of elements set forth herein, and the scope of the invention is set forth in the claims appended hereto.

BRIEF DESCRIPTION OF THE DRAWINGS

For a fuller understanding of the nature and objects of the invention, reference should be made to the following detailed description, taken in connection with the accompanying drawings, in which:

FIG. 1A is a perspective view of a first embodiment of the novel davit system when in its fully retracted configuration;

FIG. 1B is a perspective view of said first embodiment when in its fully extended configuration;

FIG. 1C is a perspective view of the first embodiment when in its fully extended configuration and where a boat has been positioned relative to the davit system so that said boat may be lifted;

FIG. 1D is a perspective view of the first embodiment when in its fully retracted configuration and where the boat of FIG. 1C has been lifted from a body of water;

FIG. 2A is a side elevational, cut-away view depicting an elongate boom arm of the first embodiment in extended relation to an elongate base;

FIG. 2B is a view like FIG. 2 but depicting the elongate boom arm in its fully extended, down position;

FIG. 3C is a view like that of FIG. 3A but depicting the elongate boom arm after its downward rotation has begun;

FIG. 3D is a view like that of FIG. 3A but depicting the elongate boom arm in fully extended relation to the elongate base, said elongate boom arm being in its downwardmost position;

FIG. 6A is a perspective view of a sixth embodiment in its fully retracted configuration.

BEST MODE FOR CARRYING OUT THE INVENTION

Figure 3A:
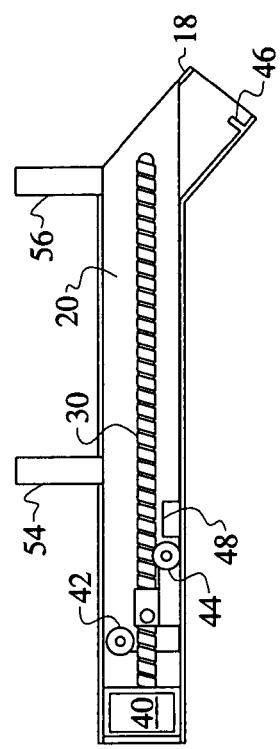
FIG. 3A is a side elevational, cut away view of a second embodiment when the elongate boom arm is fully retracted within the hollow interior of the elongate base.

Referring now to FIGS. 1A–D, it will there be seen that an illustrative embodiment of the invention is denoted as a whole by the reference numeral 10.

Davit system 10 may be mounted on a pier, wharf, swim platform of a boat, the bed of a pickup truck, and the like. As is apparent from the drawings, the novel davit system has a low profile, enabling it to be mounted on vehicles such as pickup trucks, vans, or other vehicles having space for receiving relatively large loads such as small boats, motorcycles, and so on. Thus, although the term "davit" often has a nautical connotation, the novel davit system provides means for lifting numerous items and is not limited to the lifting of water vessels.

Support structure or platform 12 may therefore be understood as being the swim platform of a boat, a pier, a pickup truck bed, and the like.

Novel davit system 10 includes two (2) lift arms, collectively denoted 14, that are secured to platform 12 in parallel relation to one another.

Each lift arm 14 has the same structure as the other lift arm. Accordingly, as this disclosure proceeds, the structure of only one lift arm is disclosed in detail.

Each lift arm 14 includes an elongate base 16 having a hollow interior and a downwardly angled free end 18 formed integrally therewith. Each lift arm 14 further includes a straight, elongate boom arm 20 that is fully received within its associated elongate base 16 when davit 10 is in its fully retracted configuration as depicted in FIGS. 1A and 1D. Each boom arm 20 has a trailing end 22 that is slidingly received within the hollow interior of its associated elongate base 16 when davit system 10 is in its fully extended configuration as illustrated in FIGS. 1B and 1C.

A pair of cradle arms, denoted 24, 24 are pivotally secured to the free end of their associated boom arm 20. They collectively form a "V" shape.

As best understood from the animation of FIGS. 1A–D, cradle arms 24, 24 are elevated to the approximate height of platform 12 when davit system 10 is in its fully retracted configuration as depicted in FIG. 1A, are lowered to a point below the surface of a body of water when in their fully extended position as depicted in FIG. 1B, remain in said FIG. 1B position so that a boat 26 may be maneuvered into position for lifting as illustrated in FIG. 1C, and are returned, with said boat, to their FIG. 1A position as illustrated in FIG. 1D. Significantly, cradle arms 24, 24 are maintained in the same upright or level orientation throughout the entire range of movement of boom arms 20, 20.

The structure for extending and retracting boom arm 20 with respect to elongate base 16 is depicted, in a first embodiment, in FIGS. 2A and 2B.

Screw follower 28 is pivotally mounted to trailing end 22 of boom arm 20 and is screw-threadedly engaged to elongate screw 30. First bevel gear 32 is secured to the trailing end of and rotates conjointly with screw 30. Second bevel gear 34 meshingly engages first bevel gear 32 and is keyed to output shaft 36 of motor 38 for conjoint rotation therewith. Gearbox 40 houses said first and second bevel gears and centers the trailing end of elongate screw 30 within the hollow interior of elongate base 16. The leading end of elongate screw 16 is centered within the hollow interior of said elongate base by screw follower 28.

Accordingly, operation of motor 38 causes rotation of elongate screw 30 about its longitudinal axis and travel of screw follower 28 along the extent of said elongate screw. More particularly, as depicted in FIG. 2A, clockwise rotation of elongate screw 30 results in left-to-right travel of screw follower 28 and counterclockwise rotation of said screw effects right-to-left travel of said screw follower. Such left-to-right travel, as drawn, causes extension of boom arm 20 and such right-to-left travel, as drawn, causes retraction of said boom arm.

FIG. 2A depicts boom arm 20 as it nears its fully extended position and FIG. 2B depicts said boom arm in said fully extended position.

More specifically, in FIG. 2A it is disclosed that upper roller 42 is rotatably mounted to boom arm 20 near trailing edge 21 of trailing end 22 of said boom arm and lower roller 44 is rotatably mounted to boom arm 20 in leading relation to said trailing edge 21. The longitudinal spacing between upper roller 42 and lower roller 44 is selected so that upper roller 42 reaches the leading end of elongate base 16 when lower roller 44 reaches its lowermost position, i.e., when boom arm 20 is fully extended as depicted in FIG. 2B.

Transversely disposed detent 46 is formed in downwardly extending part 18 of elongate base 16 and cooperates with transversely disposed notch 48 formed in bottom wall 50 of boom arm 20 to prevent over-extension of boom arm 20. As may be gleaned from a comparison of FIGS. 2A and 2B, as lower roller 44 rolls downwardly along the extent of downwardly extending part 18, boom arm 20 rotates downwardly (clockwise as drawn) until notch 48 receives detent 46. Detent 46 abuts the trailing end of notch 48, thereby preventing further extension of boom arm 20, when upper roller 42 reaches the leading end of elongate base 16.

Elongate rigid link 52 has a trailing end pivotally secured to a tab that projects from screw follower 28 and a leading end pivotally secured to a tab that projects from the apex of cradle arms 24, 24. Rigid link 52 maintains cradle arms 24, 24 in their upright, boat-cradling position as boom arm 20 rotates with respect to elongate base 16 as may be understood by comparing the respective positions of boom arm 20 in said FIGS. 2A and 2D.

Figure 3B:
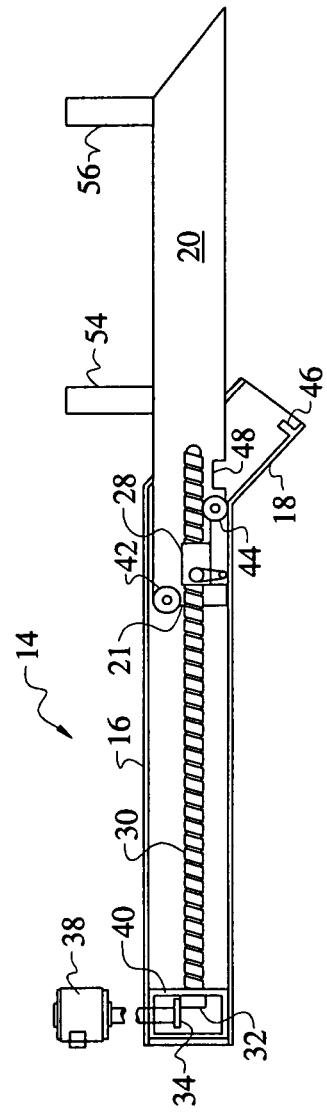
FIG. 3B is a view like that of FIG. 3A but depicting the elongate boom arm in extended relation to the elongate base.
Figure 4A:
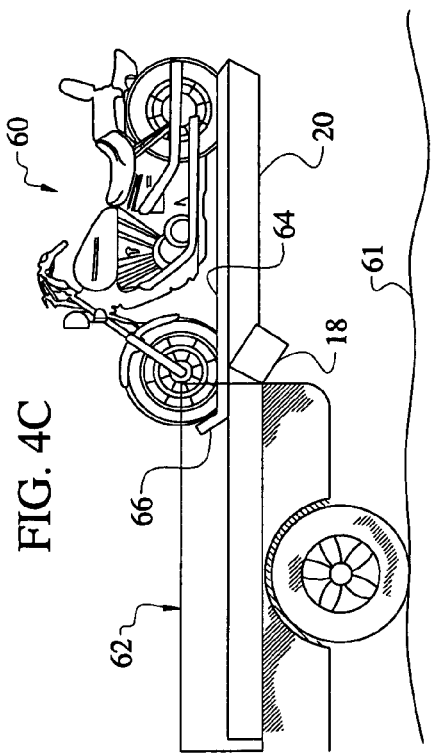
FIG. 4A is a perspective view depicting a third embodiment of the invention.
Figure 4B:
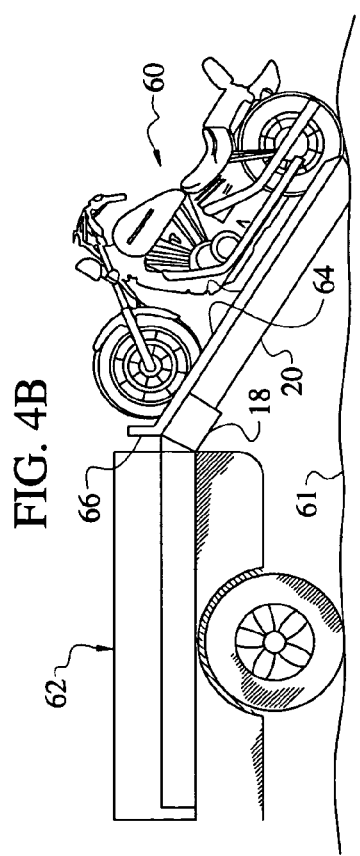
FIG. 4B is a side elevational view of the third embodiment depicting the elongate boom arm in its fully extended, downwardmost position.
Figure 4C:
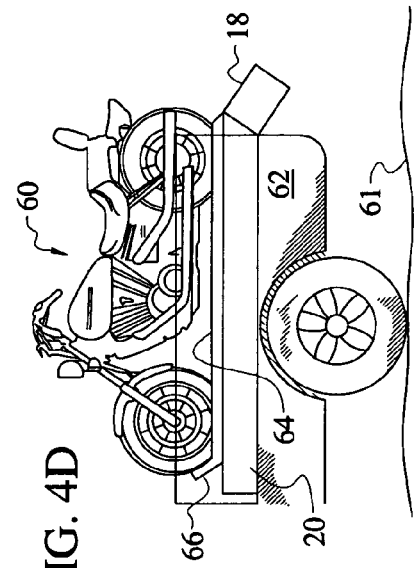
FIG. 4C is a side elevational view like that of FIG. 4B, depicting the elongate boom arm in a partially extended position.
Figure 4D:
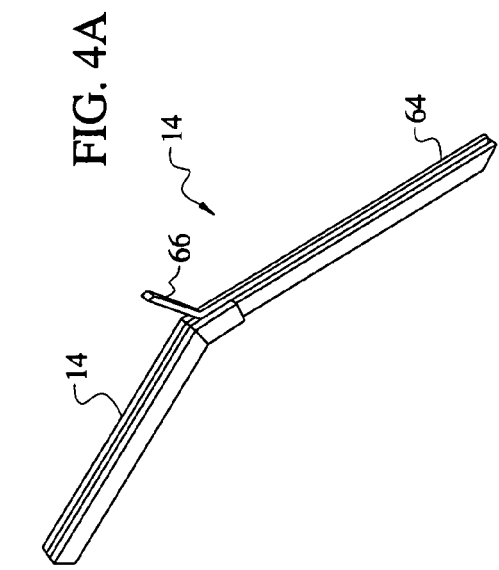
FIG. 4D is a side elevational view like that of FIG. 4C, depicting the elongate boom arm in its fully retracted position.

Elongate rigid link 52 is not provided in the embodiment of FIGS. 3A and 3B. Accordingly, cradle arms 24, 24 are eliminated, together with the tab that extends from screw follower 28 and the tab that extends from the apex of cradle arms 24, 24. In this embodiment, a pair of transversely disposed walls 54, 56 are secured in upstanding relation to boom arm 20 to provide detents that engage whatever item may be placed atop boom arm 20. Hand crank 58 replaces motor 38 because the load associated with this embodiment is unlikely to be a boat in water but rather a four-wheeled scooter or other relatively light-in-weight land vehicle.

Not all embodiments require a pair of parallel lift arms 14. In the embodiment of FIGS. 4A–D, only one lift arm 14 is employed to lift a motorcycle 60 from a road or other support surface 61 into a trailer 62 or other elevated platform. Boom arm 20 is modified in this embodiment to include a pair of transversely spaced apart upstanding sidewalls, collectively denoted 64. Sidewalls 64 provide guide walls to keep motorcycle 60 centered as it is rolled up boom arm 20. The front tire of motorcycle 60 is secured to mounting arm 66 that is bent upwardly relative to boom arm 20 so that said mounting arm provides a barrier past which said front tire may not go.

Figure 5C:
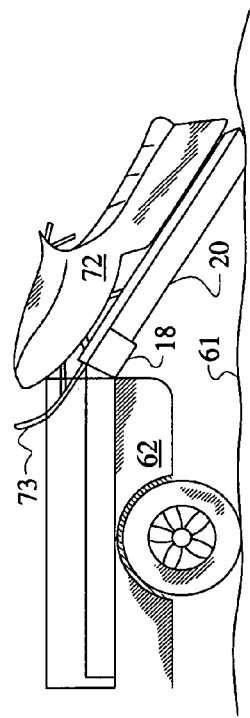
FIG. 5C is a side elevational view of the third embodiment depicting the elongate boom arm in its fully extended, downwardmost position.
Figure 5D:
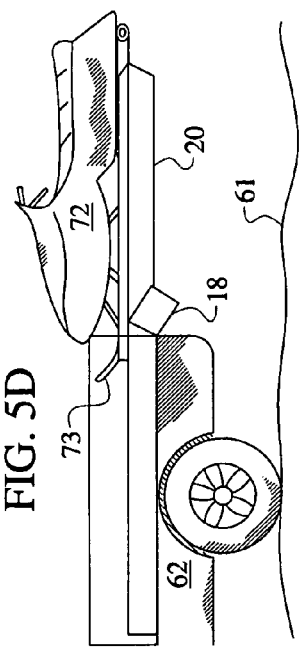
FIG. 5D is a side elevational view like that of FIG. 5C, depicting the elongate boom arm in a partially extended position.
Figure 5E:
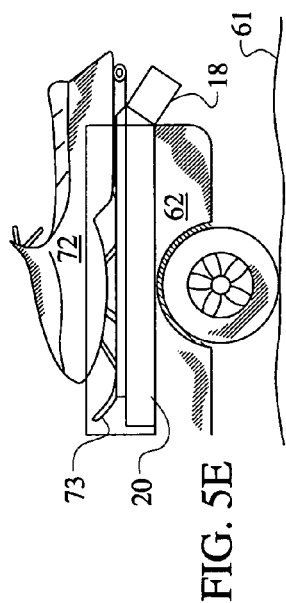
FIG. 5E is a side elevational view like that of FIG. 5C, depicting the elongate boom arm in its fully retracted position.
Figure 5A:
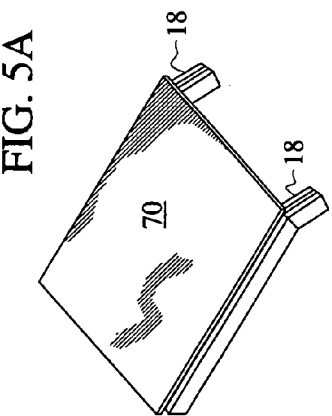
FIG. 5A is a perspective view of a fourth embodiment in a fully retracted configuration.
Figure 5B:
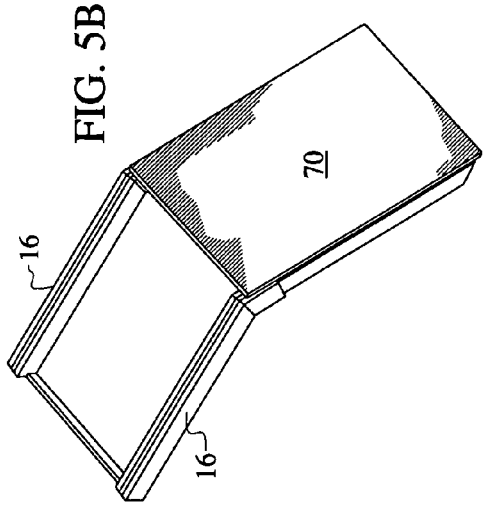
FIG. 5B is a perspective view of the fourth embodiment in a fully extended configuration.

The embodiment disclosed in FIGS. 5A–E includes a flat, planar-in-configuration support floor 70 having a fully retracted configuration depicted in FIG. 5A and a fully extended position depicted in FIG. 5B. This embodiment has utility in lifting items such as a jetski 72 having leading ski 73 onto a trailer 62. It may be observed that in this particular embodiment, support floor 70 has a length that slightly exceeds the length of each boom arm 20, thereby enabling the lifting of long items such as jetski 72.

Figure 6B:
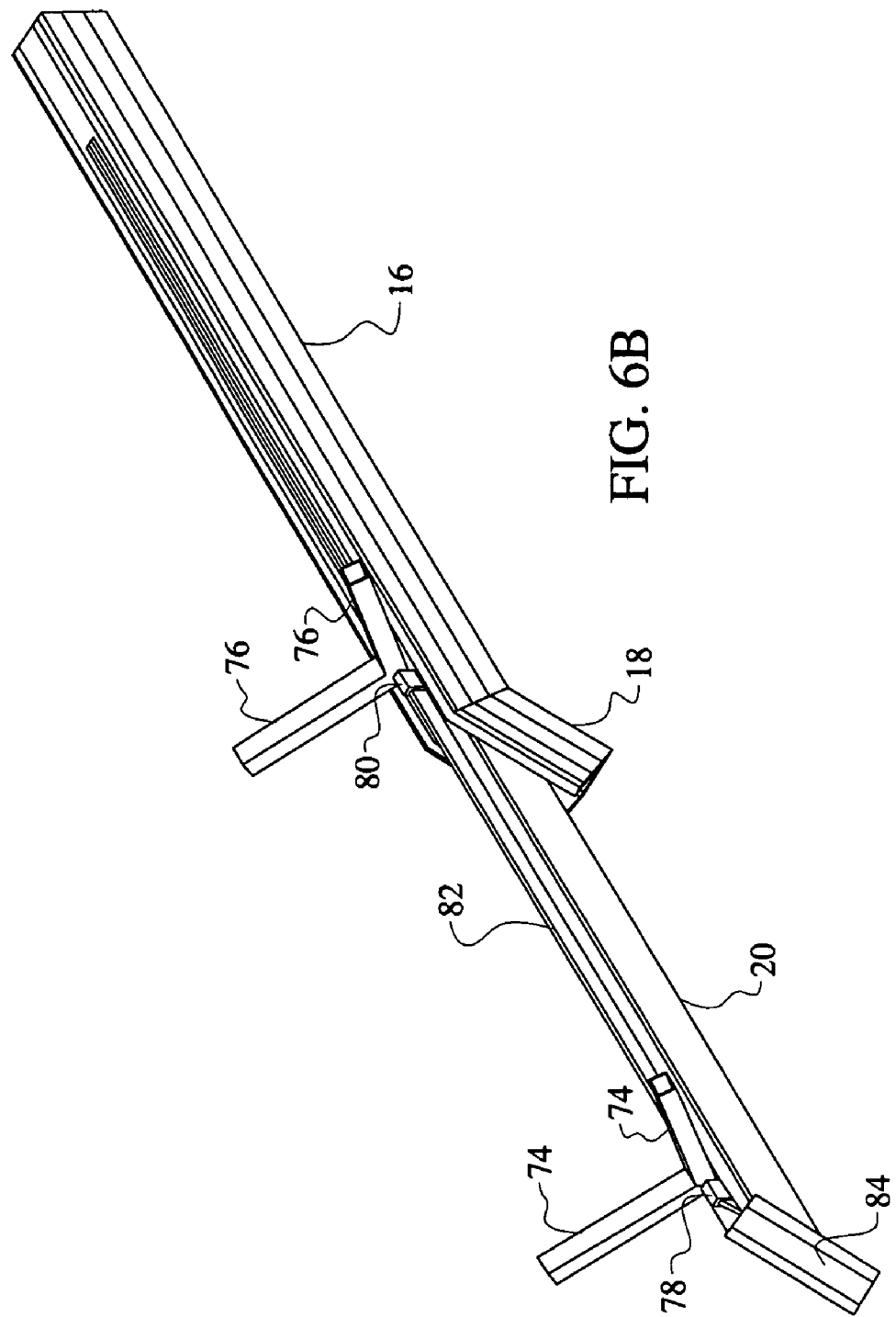
FIG. 6B is a perspective view of said sixth embodiment in its fully extended configuration.

FIGS. 6A and 6B disclose an alternative to the embodiment of FIGS. 5A–E where only one boom arm 20 is required, thereby eliminating the need for support floor 70. In this embodiment, a first pair of cradle arms, collectively denoted 74 are mounted to a leading end of boom arm 20 and a second pair of cradle arms, collectively denoted 76, are secured to a trailing end of said boom arm. More particularly, said first pair of cradles 74 is secured to an elongate, first square "U"-shaped channel 78 and said second pair of cradles 76 is secured to an elongate, second square "U"-shaped channel 80. Said channels are secured to an elongate ridge 82 that is secured to boom arm 20. Ramp 84 is secured to the leading end of boom arm 20 so that when said boom arm is fully extended as depicted in FIG. 6B, ski 73 of a jetski 72 may easily slide up said ramp 84 so that said jetski 72 may be supported by said first and second pairs of cradle arms 74, 76.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A davit system, comprising:
    an elongate base having a hollow interior and an open top;
    said elongate base including a straight part and an angled part that is angled downwardly relative to said straight part at a predetermined angle;
    an elongate boom arm slideably disposed in said hollow interior of said elongate base;
    an elongate screw rotatably mounted within the hollow interior of said elongate base;
    a screw follower mounted to a trailing end of said elongate boom arm;
    said screw follower being in screw-threaded engagement with said elongate screw so that rotation of said elongate screw in a first direction effects travel of said screw follower and hence of said elongate boom arm in a first direction relative to said elongate base and so that rotation of said elongate screw in a second direction opposite to said first direction effects travel of said screw follower and hence of said elongate boom arm in a second direction opposite to said first direction relative to said elongate base;

said elongate boom arm being fully retracted within said hollow interior of said elongate base when said elongate screw has been rotated in said first direction a predetermined number of times;

said elongate boom arm being fully extended from said hollow interior of said elongate base when said elongate screw has been rotated in said second direction a predetermined number of times;

said elongate boom arm being downwardly angled at said predetermined angle when said elongate boom arm is in said fully extended position.

2. The davit system of claim 1, further comprising:

a first gear secured to a trailing end of said elongate screw for conjoint rotation therewith;

a second gear meshingly engaged to said first gear so that rotation of said second gear effects simultaneous rotation of said first gear;

an output shaft to which said second gear is secured so that rotation of said output in a first direction causes extension of said elongate boom arm from said hollow interior of said elongate base and so that operation of said output shaft in a second direction opposite to said first direction causes retraction of said elongate boom arm into said elongate base.

3. The davit system of claim 2, further comprising:

said output shaft being the output shaft of a reversible motor.

4. The davit system of claim 2, further comprising:

said output shaft being the output shaft of a hand crank.

5. The davit system of claim 1, further comprising:

a first roller rotatably mounted to an upper, trailing end of said elongate boom arm;

a second roller rotatably mounted to a lower, trailing end of said elongate boom arm in leading relation to said first roller;

said first and second rollers being longitudinally spaced from one another by a predetermined distance;

said first roller being disposed in engagement with said elongate base when said elongate boom arm is fully extended;

said second roller being disposed in engagement with said angled part of said elongate base when said elongate boom arm is fully extended.

6. The davit system of claim 5, further comprising:

a detent formed in said angled part of said elongate base;

a notch formed in said elongate boom arm near said trailing end;

said detent being disposed within said notch when said elongate boom arm is fully extended to prevent said elongate boom arm from sliding out of said elongate base.

7. The davit system of claim 1, further comprising:

a pair of cradle arms that collectively form a "V" shape for cradling a water craft;

a tab formed integrally with said pair of cradle arms where said cradle arms meet;

said tab being pivotally mounted to a leading end of said elongate boom arm;

an elongate, rigid link having a leading end pivotally secured to said tab and a trailing end pivotally secured to said screw follower;

said pair of cradle arms being disposed in a first upright configuration when said elongate boom arm is fully retracted, when said elongate boom arm is fully extended, and when said elongate boom arm is in any position between said fully retracted and fully extended positions.

* * * * *